Figure 1:
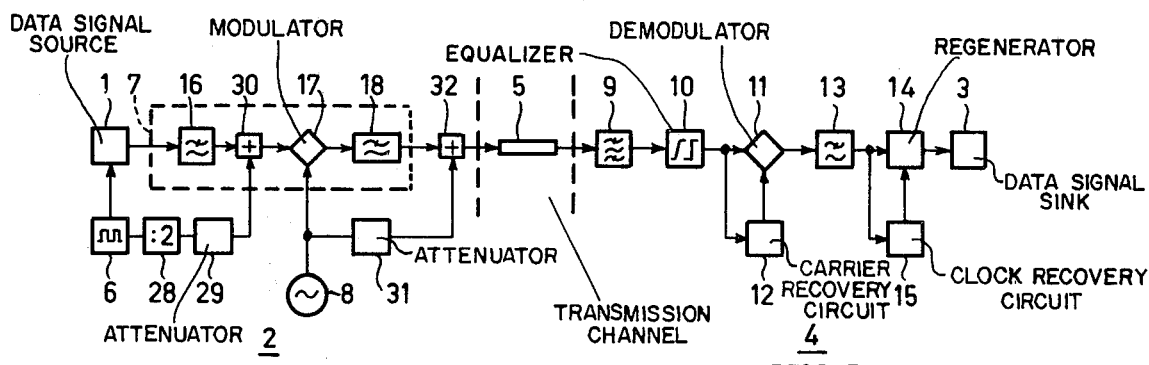

United States Patent [19]

de Jager et al.

[11] 4,074,199

[45] Feb. 14, 1978

[54] VESTIGIAL-SIDEBAND TRANSMISSION SYSTEM FOR SYNCHRONOUS DATA SIGNALS

[75] Inventors: Frank de Jager, Eindhoven, Netherlands; Juan Jose Martony, Montevideo, Uruguay

[73] Assignee: U.S. Philips Corporation, New York, N.Y.

[21] Appl. No.: 742,341

[22] Filed: Nov. 16, 1976

Related U.S. Application Data

[63] Continuation of Ser. No. 613,184, Sept. 15, 1975, abandoned.

[30] Foreign Application Priority Data

Sept. 16, 1974 Netherlands .......................... 7412226

[51] Int. Cl.$^2$ ............................................. H04B 1/68
[52] U.S. Cl. ...................................... 325/50; 325/136; 325/330
[58] Field of Search ................. 325/38 R, 49, 50, 136, 325/137, 138; 332/37 R, 44, 45

[56] References Cited

U.S. PATENT DOCUMENTS

| | | | |
|---|---|---|---|
| 3,204,029 | 8/1965 | Groff et al. | 325/136 |
| 3,638,122 | 1/1972 | Gibson | 325/50 |
| 3,706,054 | 12/1972 | Starr et al. | 325/50 X |
| 3,793,588 | 2/1974 | Gerwen et al. | 325/38 R |

*Primary Examiner*—Benedict V. Safourek
*Attorney, Agent, or Firm*—Frank R. Trifari; Daniel R. McGlynn

[57] ABSTRACT

A vestigial-sideband transmission system for synchronous data signals. The transmitter is provided with a filtering and modulating circuit for generating a vestigial-sideband channel signal which at the location of its carrier frequency and at the location of a frequency which is spaced from this carrier frequency by a distance equal to one half of the clock frequency of the data signals is a double-sideband modulated signal. In the receiver the reference carrier for coherent demodulation and the reference clock signal for regeneration can be simply recovered from the transmitted vestigial-sideband channel signal itself.

9 Claims, 9 Drawing Figures

VESTIGIAL-SIDEBAND TRANSMISSION SYSTEM FOR SYNCHRONOUS DATA SIGNALS

This is a continuation, of application Ser. No. 613,184, filed Sept. 15, 1975 now abandoned.

The invention relates to a vestigial-sideband transmission system for transmission of synchronous data signals from a transmitter to a receiver via a transmission channel of restricted bandwidth, which transmitter is provided with a data signal source, a clock signal source for synchronizing the data signal source, a carrier source and a filtering and modulating circuit which is connected to the data signal source and to the carrier source for generating a vestigial-sideband amplitude-modulated channel signal, and which receiver is provided with a selecting filter for the transmitted channel signal, a circuit for recovering a reference carrier, a demodulator which is connected to the reference carrier circuit for coherent demodulation of the transmitted channel signal, a circuit for recovering a reference clock signal and a regenerator which is connected to the reference clock signal circuit for regenerating the synchronous data signals.

Such vestigial-sideband systems use the available bandwidth of the transmission channel in a particularly efficient manner and hence are frequently used for the transmission of synchronous data signals (data signals whose elements occur according to a clock frequency) via a telephone channel. During transmission via a telephone channel or via other channels having comparable properties the channel signal is frequently subjected to disturbing frequency translations the static and dynamic components of which are generally referred to as frequency offset and phase jitter, respectively.

The coherent demodulation in the receiver requires a reference character having a correct phase relation to the carrier associated with the transmitted channel signal. In vestigial-sideband systems, this reference carrier cannot be recovered by extracting the carrier from the channel signal, because the phase of the extracted carrier depends on the data signals owing to the presence of a quadrature component at the carrier frequency.

A known method of overcoming this difficulty consists in suppressing the very low data signal frequencies in the transmitter, so that there is no data signal energy in a narrow band adjacent to the carrier frequency, and in transmitting a pilot signal at the carrier frequency. The disadvantage of this method is that the suppression of the very low data signal frequencies results in a great deal of intersymbol interference, so that in the receiver this suppression must be cancelled by means of quantized feedback.

Another known method, which avoids the latter disadvantage, consists in transmitting two pilot signals having suitably chosen frequencies outside the data signal band and in recovering the reference carrier from the selected pilot signals. However, this method not only requires additional bandwidth and power, but also has the disadvantage that the pilot signals lie near the edges of the available transmission band where the phase distortion due to the frequency characteristics of the transmission channel is most serious.

It is an object of the present invention to provide a vestigial-sideband transmission system of the type described above in which even in the case of disturbing frequency translations in the transmission channel the reference carrier and the reference clock signal can simply be recovered, both having the correct frequency and the correct phase, from the transmitted channel signal itself.

The vestigial-sideband transmission system according to the invention is characterized in that the filtering and modulating circuit in the transmitter is arranged for generating a vestigial-sideband channel signal which both at the location of its carrier frequency and at the location of a frequency which in the complete sideband is spaced from the carrier frequency by a distance equal to one half of the frequency of the clock signal is a double-sideband modulated signal within a frequency band whose width is smaller by an order of magnitude than the frequency of the clock signal.

Figure 2:
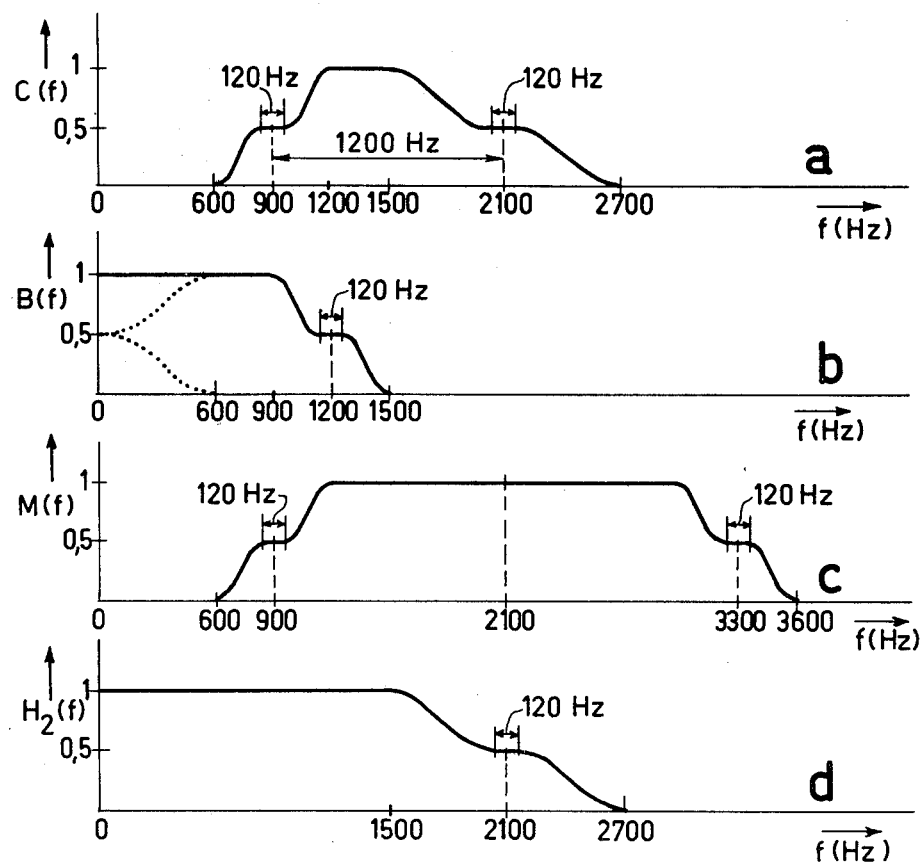
Figure 3:
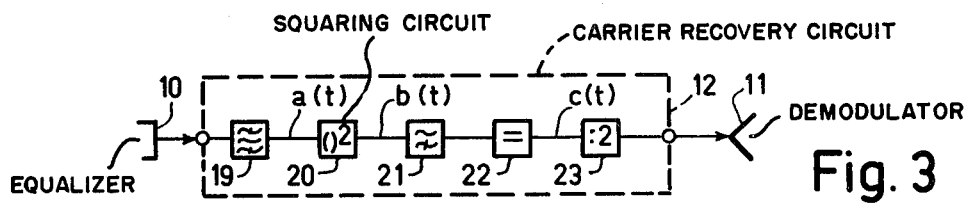
Figure 4:
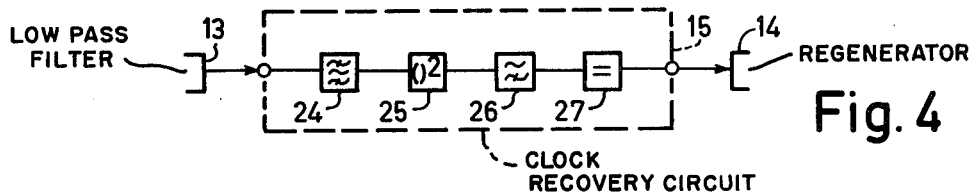
Figure 5:
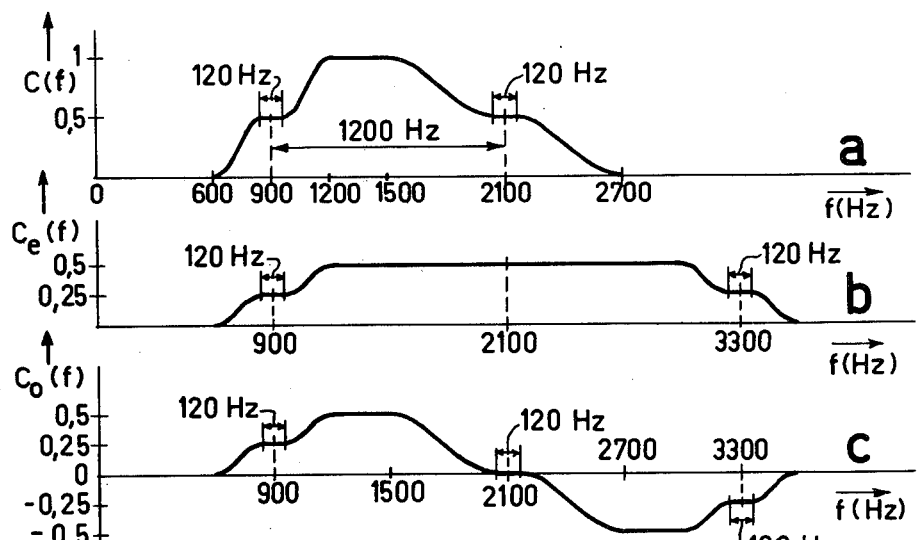
Figure 6:
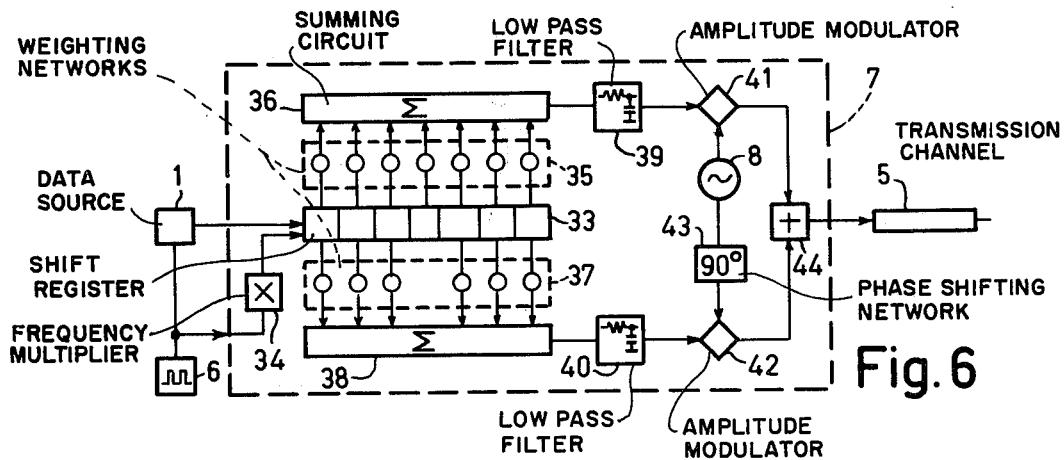
Figure 7:
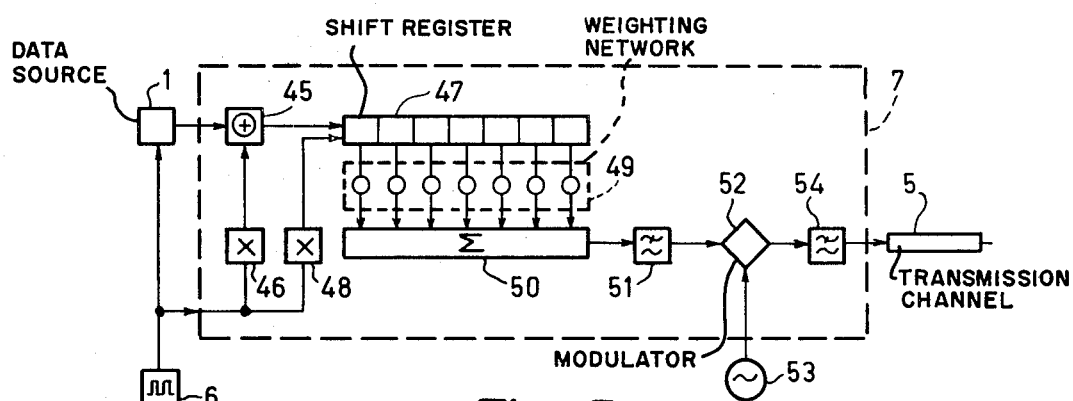
Figure 8:
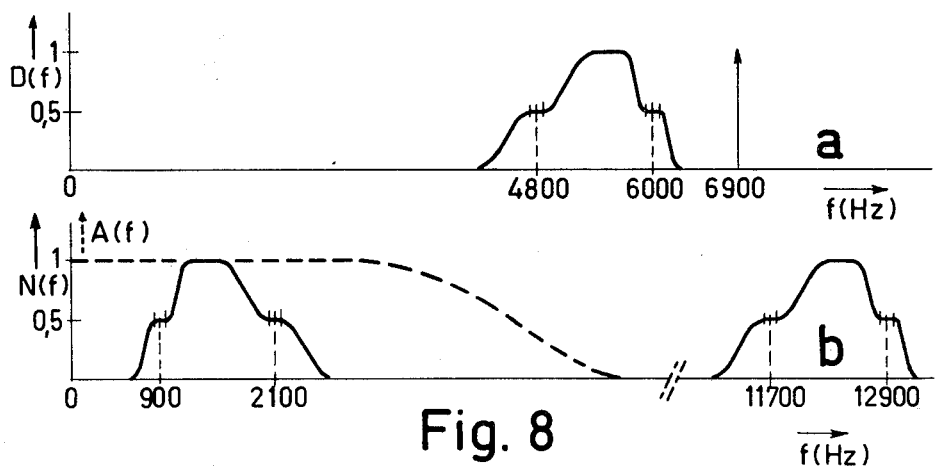
Figure 9:
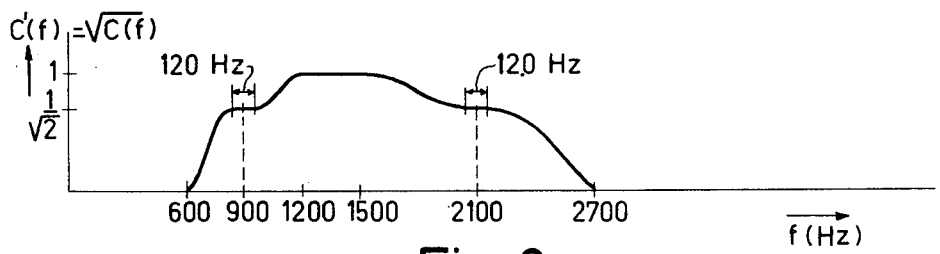

Embodiments of the invention will now be described, by way of example, with reference to the accompanying diagrammatic drawings, in which:

FIG. 1 shows a transmission system according to the invention having a transmitter for generating a vestigial-sideband channel signal according to the filter method, FIG. 2 shows frequency diagrams illustrating the operation of the system shown in FIG. 1, FIGS. 3 and 4 show circuits which in the system shown in FIG. 1 can be used for recovering the reference carrier and the reference clock signal, respectively, FIG. 5 shows frequency diagrams illustrating the generation of a vestigial-sideband channel signal according to the phase method, FIG. 6 shows a modified embodiment of the transmitter of FIG. 1 in which the phase method illustrated with reference to FIG. 5 is used, FIG. 7 shows a modified embodiment of the transmitters shown in FIGS. 1 and 6, FIG. 8 shows frequency diagrams illustrating the operation of the transmitter shown in FIG. 7, and FIG. 9 shows a frequency diagram illustrating another mode of operation of the system shown in FIG. 1.

FIG. 1 shows a system in which synchronous binary data signals at a data rate of 2,400 bit/second are transmitted from a data signal source 1 in a transmitter 2 to a data signal sink 3 in a receiver 4 via a transmission channel 5 of restricted bandwidth. This transmission channel 3, may for example, be a telephone channel and may comprise a plurality of telephone transmission links in tandem, such as subscriber's lines, systems for carrier communication via cables or radio, and one or more telephone exchanges with the associated switching equipment. The telephone channel 5 has a transmission band from 300 to 3,300 Hz of which only the central portion from 600 to 2,700 Hz is used for data transmission. This data transmission is effected by means of vestigial-sideband amplitude modulation of a carrier having a frequency of 2,100 Hz, and the transmission speed is 2,400 Baud.

The transmitter 2 includes a clock signal source 6 for synchronizing the data signal source 1 so that the elements of the binary data signal occur in accordance with a clock frequency of 2,400 Hz. This synchronous binary data signal is applied to a filtering and modulating circuit 7 to which is also applied a carrier having a frequency of 2,100 Hz and originating from a carrier source 8 for generating a vestigial-sideband amplitude-modulated channel signal which is transmitted via the telephone channel 5 to the receiver 4.

In the receiver 4, the transmitted channel signal is supplied via a selecting filter 9 and an equalizer 10 to a demodulator 11. The receiver further includes a circuit 12 which is coupled to the telephone channel 5 and serves to recover a reference carrier of 2,100 Hz which is applied to the demodulator 11 for coherent demodulation of the transmitted channel signal. To the output of the demodulator 11 is connected a low-pass filter 13 for separating the desired demodulated signal from which the original synchronous binary data signal is obtained by means of a regenerator 14. For this purpose the receiver 4 comprises a circuit 15 which is coupled to the telephone channel 5 and serves to recover a reference clock signal of 2,400 Hz which is applied to the regenerator 14. The regenerated data signal is transferred to the data signal sink 3 for further processing. The circuits 12 and 15 for recovering the reference carrier and the reference clock signal respectively may be implemented in various known manners; further particulars are not given here but can be found, for example, in W. R. Bennett and J. R. Davey, "Data Transmission," New York, McGraw-Hill, 1965.

Several methods of generating a vestigial-sideband amplitude-modulated signal are known. In the transmitter of FIG. 1 a highly usual method is employed which consists in first generating a double-sideband amplitude-modulated signal with suppressed carrier and then removing the undesired sideband in a filter having a suitably chosen transfer function. For this purpose the filtering and modulating circuit 7 of FIG. 1 includes a premodulating filter 16 which is connected to the data signal source and is in the form of a lowpass filter having a cutoff frequency equal to about one half of the clock frequency (1,200 Hz) a double-balanced amplitude modulator 17 (product modulator) which modulates the carrier from the carrier source 8 with the output signal of the premodulating filter 16, and a post-modulating filter 18 in the form of a lowpass filter having a cutoff frequency equal to the carrier frequency (2,100 Hz). This postmodulation filter 18 removes the upper sideband from the double-sideband signal generated in the amplitude modulator 17 and supplies the desired vestigial-sideband channel signal to the telephone channel 5.

The overall transfer characteristic of the transmission system of FIG. 1, inclusive of the filters 16, 18, 9, 13, the equalizer 10 and the telephone channel 5, must comply with the first Nyquist criterion so that no intersymbol interference occurs at the nominal regeneration instants. Frequently the filters in the receiver are designed so as to provide optimum noise suppression and the filters in the transmitter are designed so as to give, when used with the said filters in the receiver, the desired overall transfer characteristic. For simplicity, however, it is assumed for the present that the vestigial-sideband channel signal at the output of the transmitter 2 already satisfied the first Nyquist criterion.

According to the invention a vestigial-sideband transmission system is realized in which both the reference carrier and the reference clock signal can simply be recovered, both having the correct frequency and the correct phase, from the transmitted channel signal itself in that the filtering and modulating circuit 7 in the transmitter 2 is arranged for generating a vestigial-sideband channel signal which both at the location of its carrier frequency and at the location of a frequency which in the complete sideband is spaced from this carrier frequency by a distance euqal to one half of the frequency of the clock signal is a double-sideband modulated signal within a frequency band whose width is smaller by an order of magnitude than the frequency of the clock signal.

In FIG. 2, frequency diagram $a$ shows by way of example a spectrum $C(f)$ of the resulting vestigial-sideband channel signal at the output of the transmitter 2 of FIG. 1. Both at the carrier frequency of 2,100 Hz and at the frequency of 900 Hz which in the complete lower sideband is spaced from this carrier frequency by one half of the clock frequency (1,200 Hz) the said spectrum $C(f)$ has a flat portion within a frequency band of width, for example, 120 Hz. Furthermore, the spectrum $C(f)$ in the frequency range from 1,500 to 2,700 Hz has vestigial symmetry with respect to the value $C(2,100)$ at the carrier frequency of 2,100 Hz and also in the frequency range from 600 to 1,200 Hz it has vestigial symmetry with respect to the value $C(900)$ at the frequency of 900 Hz. Thus the requirements of the first Nyquist criterion are satisfied, as will also be seen from the spectrum $B(f)$ of the baseband signal which is obtained by coherent demodulation of this vestigial-sideband channel signal by means of a carrier of 2,100 Hz having the correct phase, which spectrum $B(f)$ is shown in frequency diagram $b$ of FIG. 2. Owing to the symmetry of $C(f)$ in the range of 1,500 to 2,700 Hz, in the coherent demodulation the partial suppression of the lower sideband in the range of 1,500 to 2,100 Hz is exactly compensated for by the partial transmission of the corresponding part of the upper sideband in the range of 2,100 to 2,700 Hz, so that $B(f)$ in the range of 0 to 600 Hz is flat (the dotted lines in frequency diagram $b$ represent the contributions of the lower and upper sideband), and the symmetry of $C(f)$ in the range of 600 to 1,200 Hz is found again in the range of 900 to 1,500 Hz, so that $B(f)$ has a vestigial symmetry with respect to the value $B(1,200)$ at the frequency of 1,200 Hz, which is exactly equal to one half of the clock frequency of the synchronous data signals.

To obtain the vestigial-sideband channel signal having the said spectrum $C(f)$ in the filtering and modulating circuit 7 of FIG. 1, the premodulating filter 16 is given a transfer function such that the spectrum of its output signal corresponds to the spectrum $B(f)$ in frequency diagram $b$ of FIG. 2. If the elements of the binary signal consist of rectangular pulses having a duration T equal to the period of the clock frequency of 2,400 Hz, the amplitude characteristic $H_1(f)$ of this premodulating filter 16 is made equal to $B(f)/S(f)$, where $S(f) = \sin(\pi fT)/\pi fT$ is the spectrum of a rectangular pulse of duration T. In the amplitude modulator 17 a double-sideband signal is produced having a spectrum $M(f)$ as shown in frequency diagram $c$ of FIG. 2. From this spectrum $M(f)$ the desired spectrum $C(f)$ is obtained by giving to the post-modulating filter 18 an amplitude characteristic $H_2(f)$ of the shape shown in frequency diagram $d$ of FIG. 2, where $H_2(f)$ in the range of 1,500 to 2,700 Hz has the same shape as $C(f)$. In the above discussion of a system in which the requirements of the first Nyquist criterion are already satisfied in the transmitter 2, it is tacitly assumed that the phase characteristics of the premodulating filter 16 and the post-modulating filter 18 are linear in the entire frequency range of interest. This fact must be taken into account in the practical design of these filters 16 and 18. Possible deviations from the desired linear phase characteristics of these filters 16 and 18 in the transmitter 2 can in practice also be corrected in the receiver 4 by means of the equalizer 10.

It will now be shown that the resulting vestigial-sideband channel signal really is a double-sideband modulated signal within a frequency band of width 120 Hz at the carrier frequency of 2,100 Hz and also at a frequency which is lower by 1,200 Hz and hence is 900 Hz.

For this purpose, in respect of the band at the carrier frequency of 2,100 Hz a component of the data signal having a frequency $f$ of less than 60 Hz will be considered. In the output signal of the amplitude modulator 17 this component gives two sideband components at the frequencies $(2,100 - f)$ and $(2,100 + f)$, which sideband components have equal amplitudes and equal but opposite phase shifts relative to the carrier of 2,100 Hz. Because the post-modulating filter 18 has a linear phase characteristic and, moreover, within a band of width 120 Hz at the frequency of 2,100 Hz has a flat amplitude characteristic (compare $H_2(f)$ in FIG. 2), the sideband components at the frequencies $(2,100 - f)$ and $(2,100 + f)$ in the vestigial-sideband channel signal also have equal amplitudes and equal but opposite phase shifts relative to the carrier of 2,100 Hz. Consequently within a band of width 120 Hz at the carrier frequency of 2,100 Hz the vestigial-sideband channel signal really is a double-sideband modulated signal.

In contrast therewith, for the band at the frequency of 900 Hz a component of the data signal will be considered which has a frequency $(1200 - f)$, where $f$ again is less than 60 Hz. It is known that in the spectrum of a synchronous data signal having a clock frequency of 2,400 Hz a component at a frequency $f$ will never occur by itself, but always will be accompanied by components at frequencies $(2,100 - f)$, $(2,400 + f)$, $(4,800 - f)$, $(4,800 + f)$, etc. The amplitudes and phases of these simultaneously occurring components depend upon the pulse shape which is used for the data signal elements, while in general the phases are either equal or differ by 180°, however, in the range of 0 to 2,400 Hz they invariably are equal, In the present case this means that the component considered which has a frequency $(1,200 - f)$ is always accompanied by a component having a frequency $(1,200 + f)$ and the same phase. Because the premodulating filter 16 has a linear phase characteristic and moreover within a band of width 120 Hz at the frequency of 1,200 Hz has an amplitude characteristic such that the output spectrum at this location is flat (compare $B(f)$ in FIG. 2), the components which always occur as a pair at the frequencies $(1,200 - f)$ and $(1,200 + f)$ have equal amplitudes and equal but opposite phase shifts relative to an imaginary carrier of 1,200 Hz. Within a band of width 120 Hz at the frequency of 1,200 Hz the baseband signal at the output of the premodulating filter 16 hence really is a double-sideband modulated signal. The same applies to the vestigial-sideband channel signal within a band of width 120 Hz at the frequency of 900 Hz, because the amplitude modulator 17 transposes the band at the frequency of 1,200 Hz in the baseband signal only with frequency-inversion to a band at the frequency of 900 Hz and furthermore the post-modulating filter at this location has both a linear phase characteristic and a flat amplitude characteristic (compare $H_2(f)$ in FIG. 2).

Owing to the fact that the vestigial-sideband channel signal at the carrier frequency of 2,100 Hz, and at the frequency which is lower by 1,200 Hz (one half of the clock frequency) and hence is 900 Hz, locally is a double-sideband modulated signal, the reference carrier for coherent demodulation and the reference clock signal for regeneration can be recovered, both having the correct frequency and the correct phase, from the transmitted channel signal itself by means of the known comparatively simple methods of recovering the reference carrier from a double-sideband signal.

FIG. 3 shows by way of example an embodiment of a very simple circuit 12 which may be used in the vestigial-sideband transmission system of FIG. 1 for recovering the reference carrier of 2,100 Hz. This circuit 12 includes a bandpass filter 19 tuned to the carrier frequency of 2,100 Hz in order to select the double-sideband portion of the channel signal at this frequency. Because the double sideband signal contains no quadrature component at the carrier frequency the output signal $a(t)$ of the bandpass filter 19 can be represented by $$a(t) = x(t) \cos (\omega_c t + \theta)$$

where $x(t)$ is representative of the components of the data signal having frequencies lower than 60 Hz, $\omega_c = 2 \cdot 2,100$ is the carrier radian frequency and $\theta$ is the carrier phase. The signal $a(t)$ is squared in the squaring circuit 20 the output signal $b(t)$ of which can be written $$b(t) = (\tfrac{1}{2}) [x^2(t) + x^2(t) \cos (2\omega_c t + 2\theta)]$$

The low-frequency part of this signal $b(t)$ is eliminated by means of a highpass filter 21 and the resulting signal is ideally limited in a limiter 22 to obtain an output signed $c(t)$ of the form $$c(t) = A \cos (2 \omega_c t + 2\theta)$$

where A is a constant. This signal $c(t)$ at twice the carrier frequency is applied to a frequency divider 23 to obtain the reference carrier having the correct frequency of 2,100 Hz and, apart from a phase ambiguity of 180°, the correct phase. The problems to which this ambiguity gives rise in the coherent demodulation can be avoided in known manner, for example by using differential coding in the data signal source 1 of the transmitter 2.

In the practical embodiment of the circuit 12 of FIG. 3 the squaring circuit 20 generally takes the form of a full-wave rectifier to which is connected a narrow bandpass filter tuned to twice the carrier frequency instead of the highpass filter 21. In many applications the said narrow bandpass filter is a phase-locked oscillator which has an input circuit for suppressing amplitude variations; in this case the frequency divider 23 is connected to the oscillator without the inerposition of the limiter 22. If the transmitted channel signal suffers from disturbing frequency offset and phase jitter, the use of a phase-locked oscillator provides the advantage that in spite of the said disturbing frequency translations the reference carrier always has the correct frequency and substantially the correct phase. In order to reduce the influence of the disturbing phase jitter, which may be considered as an incidental low-index frequency modulation of all the signal components, on the demodulated baseband signal to a small value, in the implementation of the circuit 12 for recovering the reference carrier care must be taken to ensure that the linear phase shift which this circuit introduces into the sideband components of the phase jitter is kept as small as possible.

To recover the reference clock signal a circuit may be used similar to that shown in FIG. 3 (without the frequency divider 23) to recover from the double-sideband portion of the channel signal at the frequency of 900 Hz a reference signal at twice this frequency (i.e. at 1,800 Hz), to mix this reference signal with the signal at twice the carrier frequency (i.e. at 4,200 Hz) at the output of the limiter 22 in FIG. 3, and finally to select from the mixing products the component at the difference frequency which corresponds to the reference clock signal of 2,400 Hz in the correct phase.

The reference clock signal may also be recovered from the baseband signal which is obtained by coherent demodulation of the transmitted channel signal. In the system of FIG. 1 this possibility is used, and FIG. 4 shows an example of a very simple circuit 15 which may be used for this purpose. In respect of its structure and operation the said circuit 15 differs from the circuit 12 of FIG. 3 only in that the frequency divider 23 is absent in FIG. 4. In particular, the circuit 15 includes a bandpass filter 24 tuned to the frequency of 1,300 Hz for selecting the double-sideband portion of the demodulated baseband signal at one half of the clock frequency (compare $B(f)$ in FIG. 2). This selected double-sideband portion is squared in a squaring circuit 25, the low-frequency part of the squared signal is eliminated by means of a highpass filter 26, whereupon the reference clock signal having the correct frequency of 2,400 Hz and the correct phase is obtaind by means of an ideal limiter 27. With regard to the practical implementation of the circuit 15 of FIG. 4 the same considerations apply as to the circuit 12 of FIG. 3, however, because of the coherent demodulation substantially no allowance need be made for the disturbing frequency translations.

Consequently, for recovering the reference carrier and the reference clock signal no pilot signals need be used. However, during the data transmission circumstances may occur in which temporarily there is little energy in the vestigial-sideband channel signal within the frequencies bands of width 120 Hz at the frequencies of 900 Hz and 2,100 Hz, so that the recovered reference carrier and reference clock signal may temporarily show small fluctuations. To ensure that under all circumstances sufficient energy is available for recovery without appreciable fluctuation, in FIG. 1 two pilot signals of comparatively low level having frequencies of 900 Hz and 2,100 Hz respectively are added with correct phase to the channel signal. The level of the pilot signals relative to the channel signal is, for example, −12 dB. For this purpose in FIG. 1 a pilot signal of 1,200 Hz is derived from the clock signal source 6 by means of a frequency divider 28 and an attenuator 29, which pilot signal is combined with the baseband signal at the output of the premodulating filter 16 in a combining circuit 30. Furthermore, by means of an attenuator 31 a pilot signal of 2,100 Hz is derived from the carrier source and combined with the channel signal at the output of the filtering and modulating circuit 7 in a combining circuit 32. This pilot signal at the frequency of 2,100 Hz may also be obtained by applying a direct-voltage signal of suitable value to the combining circuit 30. Another known possibility to ensure that sufficient energy is always available within the frequency bands from which the reference carrier and the reference clock signal are recovered, consists in the use of a method of data scrambling in the data signal source 1 of the transmitter 2, which method is recommended by the CCITT for some types of data transmission. In the data signal sink 3 of the receiver 4 the corresponding data descrambling must then be employed.

Thus by the use of the steps according to the invention a vestigial-sideband transmission system is obtained in which in a very simple manner the reference carrier and the reference clock signal can be recovered at the correct frequency and with the correct phase from the vestigial-sideband channel signal itself, while the disadvantages of the known more complicated methods of recovering the reference carrier and the reference clock signal are avoided and furthermore the margin for impairment of the transmission channel, such as disturbing frequency translations, is increased.

The premodulating filter 16 and the postmodulating filter 18 used in the transmitter 2 shown in FIG. 1 may be realized in analog techniques, however, the preference for a linear phase characteristic in particular greatly complicates their design and implementation. Hence it is far more attractive to realize the premodulating filter 18 as a binary transversed filter as described in U.S. Pat. No. 3,500,215 and to realize the post-modulating filter 18 as an analog code filter as described in U.S. Pat. No. 3,521,170, because the desired amplitude characteristic and the linear phase characteristic can then be obtained very simple and with a high amount of mutual freedom, whilst furthermore these types of filter are highly suitable for monolithic integration. Further particulars about design and implementation of the two types of filters can be found not only in the abovementioned Patent Specifications but also in P. Leuthold "Filternetzwerke mit digitalen Schieberegistern," Philips Res. Repts., Suppl. No. 5, 1967, and H. B. Voelcker "Generation of digital signaling waveforms," I.E.E.E. Transactions on Communication Technology, vol. COM-16, pages 81–93, February 1968.

In the transmission system of FIG. 1 the vestigial-sideband channel signal is generated according to a method of modulation which in single-sideband technology is generally referred to as filter method. However, the modulation methods known in this technology as phase method and Weaver Method can also be used for generating the desired vestigial-sideband channel signal.

For the phase method this will be described with reference to FIG. 5. Frequency diagram $a$ of FIG. 5 again shows the spectrum $C(f)$ of the vestigial-sideband channel signal (compare frequency diagram $a$ in FIG. 2). This spectrum $C(f)$ can be regarded as the sum of a part $C_e(f)$ of even symmetry with respect to the carrier frequency of 2,100 Hz, as shown in frequency diagram $b$, and of a part $C_o(f)$ of odd symmetry with respect to this carrier frequency of 2,100 Hz as shown in frequency diagram $c$. These sprectra $C_e(f)$ and $C_o(f)$ are obtainable by the phase method. $C_e(f)$ represents the spectrum at the output of a product modulator which is fed with a carrier of 2,100 Hz and a baseband signal having a spectrum $B_e(f) = C_e(f + 2,100)$, while $C_o(f)$ represents the spectrum at the output of a product modulator which is fed with a 2,100 Hz carrier shifted 90° in phase and a baseband signal having a spectrum $B_o(f) = -C_o(f + 2,100)$ likewise shifted 90° in phase.

FIG. 6 shows a simple modification of the transmitter 2 shown in FIG. 1 in which the vestigial-sideband channel signal is produced by the abovedescribed phase method and in which further the aforementioned binary transversal filters are used as premodulating filters for obtaining the desired baseband signal.

In the filtering and modulating circuit 7 of FIG. 6 the synchronous binary data signal from data source 1 is supplied to a shift register 33 the contents of which are shifted at a shift frequency equal to an integral multiple of the clock frequency of 2,400 Hz, which shift frequency is obtained by means of a frequency multiplier 34 connected to the clock signal source 6. The elements of this shift register 33 are connected to a first summing circuit 36 via a first set 35 of weighting networks and to a second summing circuit 38 via a second set 37 of weighting networks. In the manner extensively described in the aforementioned publications the weighting factors of the weighting networks of the first set 35 are dimensioned so that at the output of the first summing circuit 36 a baseband signal having a spectrum $B_e(f)$ is produced. Similarly the weighting factors of the weighting networks in the second set 37 are so dimensioned that at the output of the second summing circuit 38 a baseband signal having a spectrum $B_o(f)$ shifted 90° in phase is produced. By using the symmetry properties of $B_e(f)$ and $B_o(f)$ with respect to the frequency $f = 0$ no additional steps need be taken to obtain the desired 90° phase shift. To the outputs of the summing circuits 36 and 38 simple first-order RC low-pass filters 39 and 40 respectively are connected for suppressing the higher-order pass bands which, as is known, are produced at the shift frequency of the shift register 33 and at multiples thereof.

In amplitude modulators 41 and 42 which are realized as product modulators the obtained baseband signals are used to modulate carrier of 2,100 Hz relatively shifted in phase by 90° which are derived, directly and via a 90° phase shifting network 43 respectively, from the carrier source 8. Thus at the output of the modulator 41 a signal having a spectrum $C_e(f)$ and at the output of the modulator 42 a signal having a spectrum $C_o(f)$ is produced, and by summing these output signals in a summing circuit 44 the desired vestigial-sideband channel signal having a spectrum $C(f)$ is obtained.

In the transmitters shown in FIG. 1 and FIG. 6 the spectrum of the synchronous data signal is first limited by means of a premodulating filter and then supplied to an analog product modulator. However, the binary nature of the data signal can be used to reverse the order of premodulation filtering and modulating and the analog modulator can be replaced by a simple logic circuit to which the binary data signal and a rectangular carrier to be considered as a binary signal are applied. Thus in the transmitter a postmodulating filter only is required. A transmitter of such a structure is described in U.S. Pat. No. 3,611,143 and in P. J. van Gerwen and P. van der Wurf, "Data modems with integrated digital filters and modulators," I.E.E.E. Transactions on Communication Technology, Vol. COM-18, No. 3, pages 214–222, June 1970. However, it is also shown in these two publications that the aforementioned reversal is meaningful only if the carrier frequency is an integral multiple of one half of the clock frequency, for in this case only the distortion due to lower sidebands of carriers harmonics and to foldover of lower sidebands of both carrier and carrier harmonics about zero frequency can be regarded, as linear distortion, which then can be corrected by a linear network. The postmodulating filter can be designed so that the linear correction also is effected in it. In this case the postmodulating filter may also take the form of a simple binary transversal filter so that the transmitter as a whole is particularly suited for manufacture in monolithic integrated-circuit form.

Although in the present case the carrier frequency of 2,100 Hz is not an integral multiple of one half of the clock frequency (1,200 Hz), the abovedescribed modulation technique may still be used to obtain a simple transmitter construction, as will be described more fully with reference to the modification of the transmitters of FIG. 1 and FIG. 6 which is shown in FIG. 7.

In the filtering and modulating circuit 7 of FIG. 7 the synchronous binary data signal from the data source 1 and a rectangular carrier having a frequency of 4,800 Hz are supplied to a logic circuit 45 in the form of an exclusive-OR gate. This carrier at twice the clock frequency of 2,400 Hz is derived from the clock signal source 6 by means of a frequency multiplier 46. The exclusive-OR gate 45 forms the modulo-2 sum of the data signal and the carrier, which operation is equivalent to amplitude modulation with carrier suppression. The binary output signal of the OR-gate 45 is applied to a shift register 47 whose contents are shifted at a shift frequency which is an integral multiple of the carrier frequency of 4,800 Hz and which is also derived from the clock signal source 6 by means of a frequency multiplier 48. The elements of this shift register 47 are connected to a summing circuit 50 via a set 49 of weighting networks.

In the manner extensively described in the last-mentioned publications the weighting factors of the set 49 of weighting networks are chosen so that the lower sideband of the 4,800 Hz carrier is largely suppressed and at the same time the linear modulation distortion is corrected. In particular, these weighting factors are dimensioned so that at the output of the summing circuit 50 a vestigial-sideband signal is produced which has a spectrum $D(f)$ as shown in frequency diagram $a$ of FIG. 8. This spectrum $D(f)$ satisfies the relation $D(f) = C(6,900 - f)$, where $C(f)$ is the spectrum of the desired vestigial-sideband channel signal (compare frequency diagram $a$ of FIG. 2). Here also a simple first-order RC lowpass filter 51 is connected to the output of the summing circuit 50 to suppress higher-order pass bands at the shift frequency and at multiples thereof.

In an analog product modulator 52 the vestigial-sideband signal having a spectrum $D(f)$ modulates a carrier of 6,900 Hz derived from a carrier source 53. The output signal from modulator 52 then has a spectrum $N(f)$ as shown in frequency diagram $b$ of FIG. 8. As will also be seen from FIG. 8, the lower sideband exactly corresponds to the desired vestigial-sideband channel signal having a spectrum $C(f)$ and the upper sideband is spaced from the lower side band by a distance such that the upper sideband can be eliminated by means of a lowpass filter 54 having an amplitude characteristic $A(f)$, for example, of the shape shown by a broken line in frequency diagram $b$.

Thus, in general, in the case of carrier frequencies of the vestigial-sideband channel signal not equal to an integral multiple of one half of the clock frequency, for the first modulation step a carrier frequency is chosen which is equal to an integral multiple of one half of the clock frequency, while furthermore this multiple and the carrier frequency for the second modulation step are chosen so that one sideband of the resulting signal exactly corresponds to the vestigial-sideband channel signal having the desired carrier frequency and the other side-band is spaced therefrom by a distance large enough to enable it to be eliminated by means of a simple filter.

The filtering and modulating circuit 7 in the transmitter may also be entirely realized in digital techniques. For this purpose in the transmitter each element of the synchronous binary data signal from data source 1 is sampled once to ascertain whether this element represents a binary value "1" or a binary value "0". These data signal samples constitute the digital input signal for a digital filtering and modulating circuit 7 and are processed therein in the form of code words which represent numbers. The code words at the output of the digital circuit 7 are converted in a digital-to-analog converter into the corresponding amplitude values of a current or voltage, and the desired vestigial-sideband channel signal is derived from the resulting quantized signal by a low-pass filter.

In such a digital data transmitter, when carrying out the operations, the main line of the modulation schedule used in FIG. 7 can be followed. However, it is not necessary actually to perform the operation which corresponds to the first modulation step in order to obtain the code words which represent the samples of the vestigial-sideband signal at the first carrier frequency of 4,800 Hz, for, as has been mentioned hereinbefore, in the spectrum of the data signal having a clock frequency of 2,400 Hz a component at a frequency $f$ does not occur isolated but is always accompanied with components having frequencies $(2,400 - f)$, $(2,400 + f)$, $(4,800 - f)$, $(4,800 + f)$, etc., the amplitudes and phases of these simultaneously occurring components being dependent on the pulse shape of the data signal element. In the digital data transmitter the pulse shape of the digital input signal (the data signal samples) is that of a Dirac pulse the spectrum of which, as is known, is flat throughout the entire frequency range. As a result, in the spectrum of the digital input signal the simultaneously occurring components of frequencies $f$, $(2,400 - f)$, $(2,400 + f)$, $(4,800 - f)$, $(4,800 + f)$, etc. all have the same amplitude and phase. Hence the vestigial-sideband signal at the frequency of 4,800 Hz can directly be derived from the digital input signal by means of a bandpass filter.

In a co-pending patent application (PHN 7727) is described how such a digital data transmitter can be realized with a minimum of technical means.

In the explanation given hitherto the data rate (2,400 bit/sec) is equal to the transmission speed (2,400 Baud). The vestigial-sideband transmission system according to the invention obviously is not restricted thereto. For example, data signals at a data rate of 4,800 bit/sec also may be transmitted at a transmission speed of 2,400 Baud. For this purpose, in the present system the elements of the data signal are divided in groups each comprising two elements. In FIG. 1, these groups can be subjected to a four-level encoding such that the data signal elements again occur in accordance with the 2,400 Hz clock frequency but have four levels (for example $+3$, $+1$, $-1$, $-3$) instead of two levels. The regenerator in the receiver then is adapted to this four-level encoding. In the embodiments of FIG. 6 and FIG. 7 the same result is obtainable by converting the said groups by means of a series-parallel converter into groups which each comprise two simultaneously occurring elements. Thus two parallel data signals at a clock frequency of 2,400 Hz are obtained which each can be individually processed in the manner shown in the Figures and then can be combined, using different weighting factors (in a ratio of 2 : 1), to form the ultimate vestigial-sideband channel signal. Finally, in the digital data transmitter the dibit encoding which corresponds to the four-level encoding can be applied to these groups.

Furthermore it has so far been assumed that the requirements of the first Nyquist criterion are already satisfied at the output of the transmitter. However, these requirements may alternatively be jointly satisfied by the transmitter and the receiver and, may, for example, be evenly divided between the transmitter and the receiver. For this purpose, for example, the transmitter 2 of FIG. 1 is arranged so that the vestigial-sideband channel signal at the output now has a spectrum $C'(f)$ as shown in the frequency diagram of FIG. 9. This spectrum satisfies the relation $C'(f) = \sqrt{C(f)}$, where $C(f)$ is the spectrum shown in frequency diagram $a$ of FIG. 2. Imparting, for example, an amplitude characteristic $H_3(f) = C'(f)$ to the selecting filter 9 in the receiver 4 of FIG. 1 ensures that the vestigial-sideband channel signal at the input of the demodulator 11 again has a spectrum $C(f)$. Although such an even distribution between transmitter and receiver has advantages in respect of noise suppression, the approach which is described hereinbefore and in which the receiver is not involved is to be preferred in practice, because the design and implementation of a selecting filter having the required amplitude characteristic $H_3(f)$ and at the same time a linear plane characteristic will be particularly complex.

What is claimed is:

1. Vestigial-sideband transmission system for transmission of synchronous data signals from a transmitter to a receiver via a transmission channel of restricted bandwidth, comprising a transmitter including a data signal source, a clock signal source connected to said data signal source for synchronizing said data signal source, a carrier source, and a filtering and modulating circuit connected to the data signal source and to the carrier source for generating a vestigial-sideband amplitude-modulated channel signal comprising a shift register having an input connected to the output of said data signal source, and an output;

a frequency multiplier connected to the output of said clock signal source for determining the shift frequency of said shift register;

a weighting circuit having an input connected to said output of said shift register, and an output for producing a baseband signal with a predetermined frequency spectrum; and filtering and modulating means connected to said output of said weighting circuit for producing a modulated signal.

2. The system as defined in claim 1, wherein said weighting circuit comprises a weighting network connected to said shift register, and a summing circuit connected to the output of said weighting network.

3. The system as defined in claim 1, wherein said filtering and modulating means comprises a low pass filter having an input connected to said output of said weighting circuit, and an amplitude modulator connected to the output of said low pass filter.

4. The system as defined in claim 1, wherein said weight-circuit comprises two weighting networks having inputs connected to said output of said shift register, and two summing circuits connected to the respective output of said weighting network, for producing two baseband signals with two different predetermined frequency spectrums; and wherein said filtering and modulating means comprises two low pass filters connected to the respective outputs of said two summing circuits, and two amplitude modulators connected to the two respective outputs of said low pass filters; said carrier source being connected to one of said amplitude modulators, and a phase shifting network connected to the output of said carrier source for producing a phase shifted carrier which is applied to said other amplitude modulator.

5. The system as defined in claim 1, further comprising a summing circuit having inputs connected to said first and second amplitude modulators for producing a modulated output signal having a predetermined frequency spectrum.

6. Vestigial-sideband transmission system for transmission of synchronous data signals from a transmitter to a receiver via a transmission channel of restricted bandwidth, comprising
- a transmitter including a data signal source, a clock signal source connected to said data signal source for synchronizing said data signal source, a carrier source, and a filtering and modulating circuit connected to the data signal source and to the carrier source for generating a vestigial-sideband amplitude-modulated channel signal comprising
- a low pass filter having an input connected to the output of said data signal source, and an output, and having a cutoff frequency substantially equal to one-half the frequency of said clock signal source;
- a double-balanced amplitude modulator connected to said carrier source and to the output of said low pass filter; and
- a postmodulating filter connected to the output of said amplitude modulator and having a cutoff frequency equal to said carrier frequency, for producing a vestigial-sideband channel signal, which at the location of its carrier frequency, and at the location of a second frequency spaced from said carrier frequency by a distance equal to one half of the frequency of said clock signal source, is double-sideband modulated within a frequency band whose width is smaller by one order of magnitude than the frequency of said clock signal source; and
- a receiver including a selecting filter for the transmitted channel signal, a circuit for recovering a reference carrier, a demodulator connected to the reference carrier circuit for coherent demodulation of the transmitter channel signal, a circuit for recovering a reference clock signal and a regenerator connected to the reference clock signal circuit for generating the synchronous data signals.

7. Vestigial-sideband transmission system for transmission of synchronous data signals from a transmitter to a receiver via a transmission channel of restricted bandwidth, comprising:
- a transmitter including a data signal source; a clock signal source connected to said data signal source for synchronizing said data signal source; a carrier source; and a filtering and modulating circuit connected to the data signal source and to the carrier source for generating a vestigial-sideband amplitude-modulated channel signal comprising means for generating a vestigial-sideband channel signal which at the location of its carrier frequency, and at the location of a frequency spaced from said carrier frequency by a distance equal to one half of the frequency of the clock signal, is double-sideband modulated within a predetermined frequency band whose width is smaller by one order of magnitude than the frequency of the clock signal; and
- a receiver including a selecting filter having an input for receiving the transmitted channel signal and an output, circuit means for recovering a reference carrier having an demodulator connected to the reference carrier circuit for coherent demodulation of the transmitted channel signal, a circuit for recovering a reference clock signal and a regenerator connected to the reference clock signal circuit for regenerating the synchronous data signals.

8. The system as defined in claim 7, wherein said carrier source produces a frequency of approximately 2100 Hz, and said frequency spaced from said carrier frequency is approximately 900 Hz.

9. The system as defined in claim 1, wherein said modulating circuit produces a double-sideband lies within a frequency band of 120 Hz.

* * * * *